(12) United States Patent
Fukunaga

(10) Patent No.: US 10,309,547 B2
(45) Date of Patent: Jun. 4, 2019

(54) SOLENOID HAVING ROD-CONNECTED PLUNGER WITH OUTER EDGE EXTENSION PORTION SUBJECTED TO A STROKE

(71) Applicant: EAGLE INDUSTRY CO., LTD., Minato-ku, Tokyo (JP)

(72) Inventor: Shuji Fukunaga, Tokyo (JP)

(73) Assignee: EAGLES INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 15/535,397

(22) PCT Filed: Dec. 21, 2015

(86) PCT No.: PCT/JP2015/085610
§ 371 (c)(1),
(2) Date: Jun. 12, 2017

(87) PCT Pub. No.: WO2016/104392
PCT Pub. Date: Jun. 30, 2016

(65) Prior Publication Data
US 2017/0350528 A1    Dec. 7, 2017

(30) Foreign Application Priority Data
Dec. 26, 2014    (JP) .................. 2014-266379

(51) Int. Cl.
*F16K 31/06* (2006.01)
*H01F 7/16* (2006.01)
*H01F 7/08* (2006.01)

(52) U.S. Cl.
CPC ....... *F16K 31/0675* (2013.01); *H01F 7/1607* (2013.01); *H01F 2007/085* (2013.01); *H01F 2007/086* (2013.01)

(58) Field of Classification Search
CPC ............... F16K 31/0675; H01F 7/1607; H01F 2007/086; H01F 2007/085
(Continued)

(56) References Cited

U.S. PATENT DOCUMENTS 5,413,082 A * 5/1995 Cook ................. F02M 25/0836
                                                        123/458
6,308,667 B1 * 10/2001 Tsai .......................... F01L 9/04
                                                        251/129.1
(Continued)

FOREIGN PATENT DOCUMENTS

CN      201527872 U      7/2010
CN      102996884 A      3/2013
(Continued)

OTHER PUBLICATIONS

International Search Report (ISR) dated Mar. 15, 2016, issued for International application No. PCT/JP2015/085610.
(Continued)

*Primary Examiner* — John Bastianelli
(74) *Attorney, Agent, or Firm* — Law Office of Katsuhiro Arai

(57) ABSTRACT

A solenoid includes a molded coil having a hole at the center of a coil of a plurality of turns, a solenoid body having a case covering the outer perimeter of the molded coil, a movable plunger inserted in the hole, and a magnetic attraction portion disposed in a direction in which the plunger is moved and attracted by magnetic force produced by the coil, an annular plate adjacent to the coil of the molded coil opposite to the solenoid body, and a sleeve facing the magnetic attraction portion via an air gap and supporting one end of a rod connected to the plunger, in which a magnetic circuit L is formed through the magnetic attraction portion, the case, the sleeve, and the plunger, and back to the magnetic attraction portion, and the plunger has at least one
(Continued)

outer edge extension formed by an outer edge portion extended axially.

1 Claim, 6 Drawing Sheets

(58) Field of Classification Search
USPC ........ 251/129.15–129.22; 335/255, 279, 281
See application file for complete search history.

(56) References Cited

U.S. PATENT DOCUMENTS

| | | | |
|---|---|---|---|
| 6,759,934 B2* | 7/2004 | Bircann | H01F 7/081 335/279 |
| 7,808,134 B2* | 10/2010 | Burnett | F16F 13/264 251/129.15 |
| 8,264,312 B2* | 9/2012 | Hamaoka | F16K 27/029 335/255 |
| 8,469,334 B2* | 6/2013 | Yamagata | H01F 7/1607 251/129.07 |
| 2002/0104977 A1 | 8/2002 | Bircann et al. | |
| 2004/0113730 A1 | 6/2004 | Watanabe et al. | |
| 2004/0257185 A1* | 12/2004 | Telep | H01F 7/13 335/220 |
| 2012/0242436 A1* | 9/2012 | Murao | H01F 7/081 335/255 |
| 2013/0068975 A1* | 3/2013 | Kondo | F01L 1/34 251/129.01 |

FOREIGN PATENT DOCUMENTS

| | | |
|---|---|---|
| JP | H11191512 A | 7/1999 |
| JP | 2002260512 A | 9/2002 |
| JP | 2005045217 A | 2/2005 |
| JP | 2013077792 A | 4/2013 |
| JP | 2014027204 A | 2/2014 |
| WO | 2003056579 A1 | 7/2003 |

OTHER PUBLICATIONS

A First Office Action issued by the State Intellectual Property Office of China dated Feb. 2, 2018 for Chinese counterpart application No. 201580066922.5.

* cited by examiner

SOLENOID HAVING ROD-CONNECTED PLUNGER WITH OUTER EDGE EXTENSION PORTION SUBJECTED TO A STROKE

This application is the U.S. National Phase under 35 U.S.C. § 371 of International Application PCT/JP2015/085610, filed Dec. 21, 2015, which claims priority to Japanese Patent Application No. 2014-266379, filed Dec. 26, 2014. The International Application was published under PCT Article 21(2) in a language other than English.

TECHNICAL FIELD

The present invention relates to solenoids used in solenoid valves and the like for various hydraulic and pneumatic control devices such as shock absorbers.

BACKGROUND ART

Conventional solenoids of this type include the one shown in FIGS. 4 and 5, for example.

A solenoid 50 is formed by integrating a molded coil 51 and a solenoid body 52 into one piece.

The molded coil 51 is wound with a coil 53. At the center of the coil 53, a hole 54 hollow toward the solenoid body 52 is formed.

Opposite to the solenoid body 52, the molded coil 51 is provided with an annular plate 55 adjacent to the coil 53. At the front of the plate 55, a molded portion 56 forming the bottom of the hole 54 is provided. In the molded portion 56, a coil wire drawn out from the coil 53 is connected to a lead wire 57.

On the other hand, the solenoid body 52 is provided, at an axially central portion, with a column portion 58 inserted in the hole 54 of the molded coil 51, and a case 59 covering the outer perimeter of the molded coil 51 at a distance from the column portion 58 with a portion in which the molded coil 51 is disposed as an annular space.

The column portion 58 of the solenoid body 52 is provided with a magnetic attraction portion 60 formed integrally with the case 59 by one member, a plunger 61 magnetically attracted to the magnetic attraction portion by passing current through the coil 53, a rod 62 connected to the plunger 61, a bearing 63 supporting the rod 62, a sleeve 64 covering the distal end of the column portion 58, and a cylinder 65 made from a non-magnetic material forming a magnetic interruption portion between the sleeve 64 and the magnetic attraction portion 60.

A plug 66 is disposed on the inside-diameter side of the magnetic attraction portion 60. A second bearing 68 is fitted in the inside-diameter side of the plug 66.

The magnetic attraction portion 60 extends from the inside-diameter end of an annular radial portion 67 toward the molded coil 51. The case 59 also extends from the outside-diameter end of the annular radial portion 67 toward the molded coil 51.

In the solenoid 50 of the above configuration, by supplying current to the coil 53 through the lead wire 57, as shown in FIG. 5, a magnetic circuit L through the magnetic attraction portion 60, the case 59, the plate 55, the sleeve 64, and the plunger 61, and back to the magnetic attraction portion 60 is formed, and the plunger 61 is magnetically attracted to the magnetic attraction portion 60.

When no current is supplied to the coil 53, under a biasing force by a spring or the like not shown, the plunger 61 is located away from the magnetic attraction portion 60 as shown in FIG. 4.

Of a solenoid as described above (Hereinafter, it is referred to as "Conventional Art 1." See Patent Document 1, for example), attraction force and flat characteristics in a necessary stroke are required within required solenoid body dimensions (size).

However, in Conventional Art 1, as shown in FIG. 5, the extent of a magnetic flux transfer portion A between the plunger 61 and the sleeve 64 is small near an attraction end state of the plunger 61 (a state where the plunger 61 is in proximity to the plug 66), and magnetic flux cannot be transferred adequately. This results in a problem that attraction force is reduced, and flat characteristics cannot be obtained in the entire range of a necessary stroke.

A solenoid in which, in order to reduce variations in magnetic attraction force due to stroke change without increasing body dimensions, a hole in which a portion of a second stator core containing a movable core is inserted is provided in a yoke to increase the axial length of a magnetic transmission portion is known (Hereinafter, it is referred to as "Conventional Art 2." See Patent Document 2, for example).

However, in Conventional Art 2, it is necessary to increase the axial lengths of two members, the movable core and the second stator core, as a set, increasing the material cost and the production cost. Further, the entire movable core is lengthened, so that there is a problem that the weight of a movable portion is increased, worsening responsivity.

CITATION LIST

Patent Document

Patent Document 1: Republication of WO 2003/056579 A
Patent Document 2: JP 2014-27204 A

SUMMARY OF THE INVENTION

Problem to be Solved by the Invention

The present invention has been made to solve the problems of the above conventional arts, and has an object of providing a solenoid capable of providing flat characteristics while providing required attraction force in a necessary stroke without increasing the body dimensions (size) of the solenoid.

Means for Solving Problem

To attain the above object, a solenoid according to a first aspect of the present invention is a solenoid including a molded coil having a hole at a center of a coil of a plurality of turns, a solenoid body having a case covering an outer perimeter of the molded coil, a movable plunger inserted in the hole at the center of the molded coil, and a magnetic attraction portion disposed in a direction in which the plunger is moved and attracted by magnetic force produced by the coil, and a sleeve facing the magnetic attraction portion via an air gap and supporting one end of a rod connected to the plunger, in which a magnetic circuit is formed through the magnetic attraction portion, the case, the sleeve, and the plunger, and back to the magnetic attraction portion, and the plunger has at least one outer edge extension formed by an outer edge portion extended axially.

According to this aspect, attraction force near the end of attraction of the plunger can be increased, necessary attraction force can be provided throughout, and flat solenoid characteristics can be obtained.

Further, since only the outer edge portion of the plunger is extended, an increase in the weight of a movable portion can be reduced, and the worsening of responsivity can be prevented.

According to a second aspect of the present invention, in the solenoid according to the first aspect, a recessed portion is formed in a member facing the at least one outer edge extension.

According to this aspect, a magnetic flux reception area in the attraction end state of the plunger can be increased without changing the stroke range, compared to a condition where there are no outer edge extensions, flat solenoid characteristics can be obtained without reducing attraction force in the entire range of the stroke, and stable drive can be provided. The body dimensions (size) of the solenoid are not increased. Further, since there is no need to increase the body dimensions (size) of the solenoid, increases in the material cost and the production cost can be prevented.

According to a third aspect of the present invention, in the solenoid according to the first or second aspect, the at least one outer edge extension includes two outer edge extensions formed at both ends of the plunger in the direction in which the plunger is moved by magnetic force.

According to this aspect, since the shape of the plunger is symmetrical with respect to the movement direction, when the solenoid is assembled, it can be assembled without caring about the forward and reverse directions of the plunger, providing favorable assembling characteristics.

Effect of the Invention

The present invention achieves the following outstanding effects:

(1) The plunger has the at least one outer edge extension formed by the outer edge portion extended axially, so that attraction force near the end of attraction of the plunger can be increased, necessary attraction force can be provided throughout, and flat solenoid characteristics can be obtained.

Further, since only the outer edge portion of the plunger is extended, an increase in the weight of a movable portion can be reduced, and the worsening of responsivity can be prevented.

(2) The recessed portion is formed in the member facing the at least one outer edge extension, so that the magnetic flux reception area in the attraction end state of the plunger can be increased without changing the stroke range, compared to a condition where there are no outer edge extensions, flat solenoid characteristics can be obtained without reducing attraction force in the entire range of the stroke, and stable drive can be provided. The body dimensions (size) of the solenoid are not increased. Further, since there is no need to increase the body dimensions (size) of the solenoid, increases in the material cost and the production cost can be prevented.

(3) Since the outer edge extensions are formed at both ends of the plunger in the direction in which the plunger is moved by magnetic force, the shape of the plunger is symmetrical with respect to the movement direction. Therefore, when the solenoid is assembled, it can be assembled without caring about the forward and reverse directions of the plunger, providing favorable assembling characteristics.

DESCRIPTION OF EMBODIMENT

Hereinafter with reference to the drawings, forms for implementing this invention will be described illustratively based on an embodiment. However, the dimensions, materials, shapes, relative arrangements, and others of components described in the embodiment are not intended to limit the scope of the present invention only to them unless otherwise described explicitly.

First Embodiment

Figure 1:
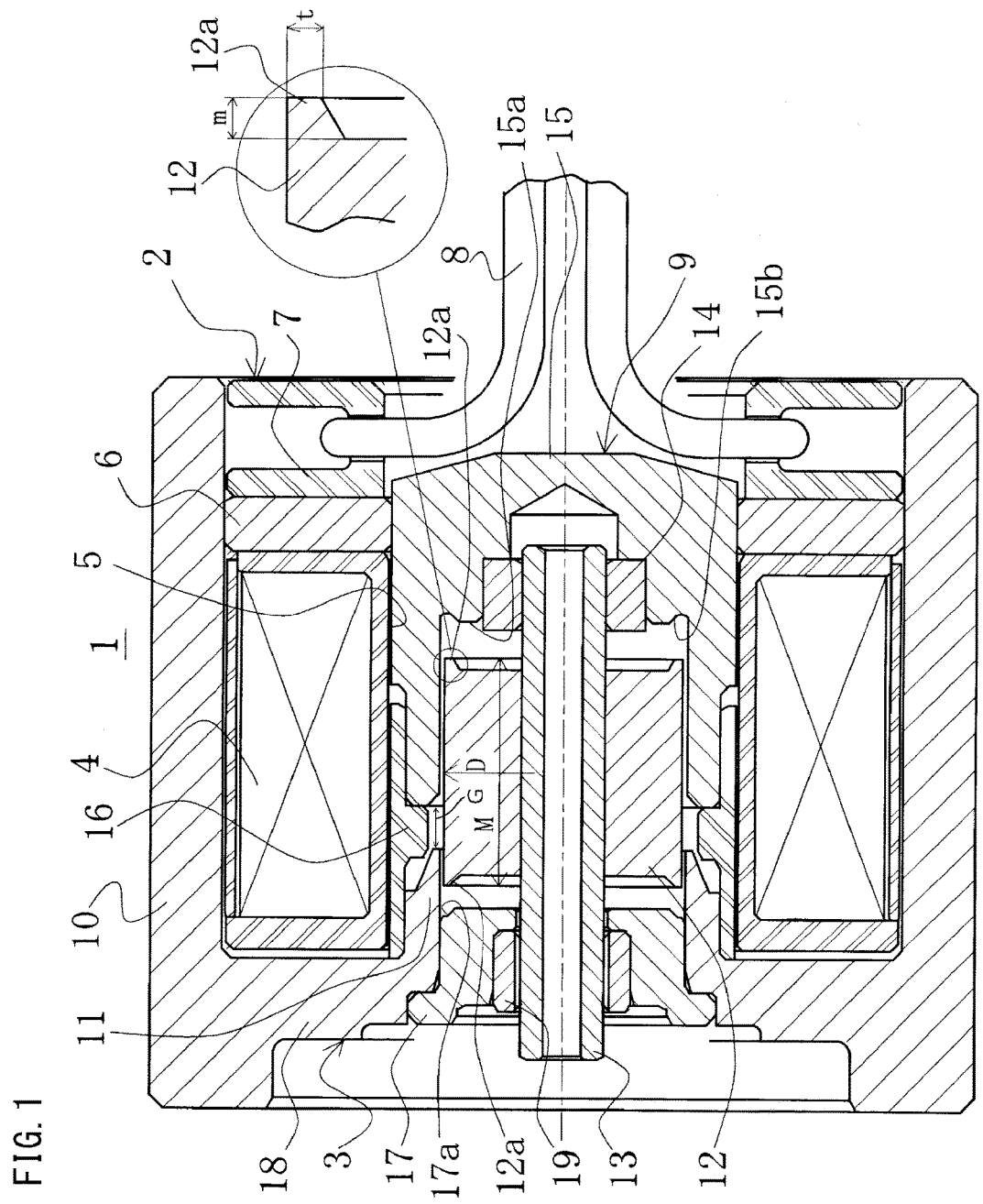
FIG. 1 is a cross-sectional view showing a solenoid according to a first embodiment of the present invention, showing a state where a coil is not energized.
Figure 2:
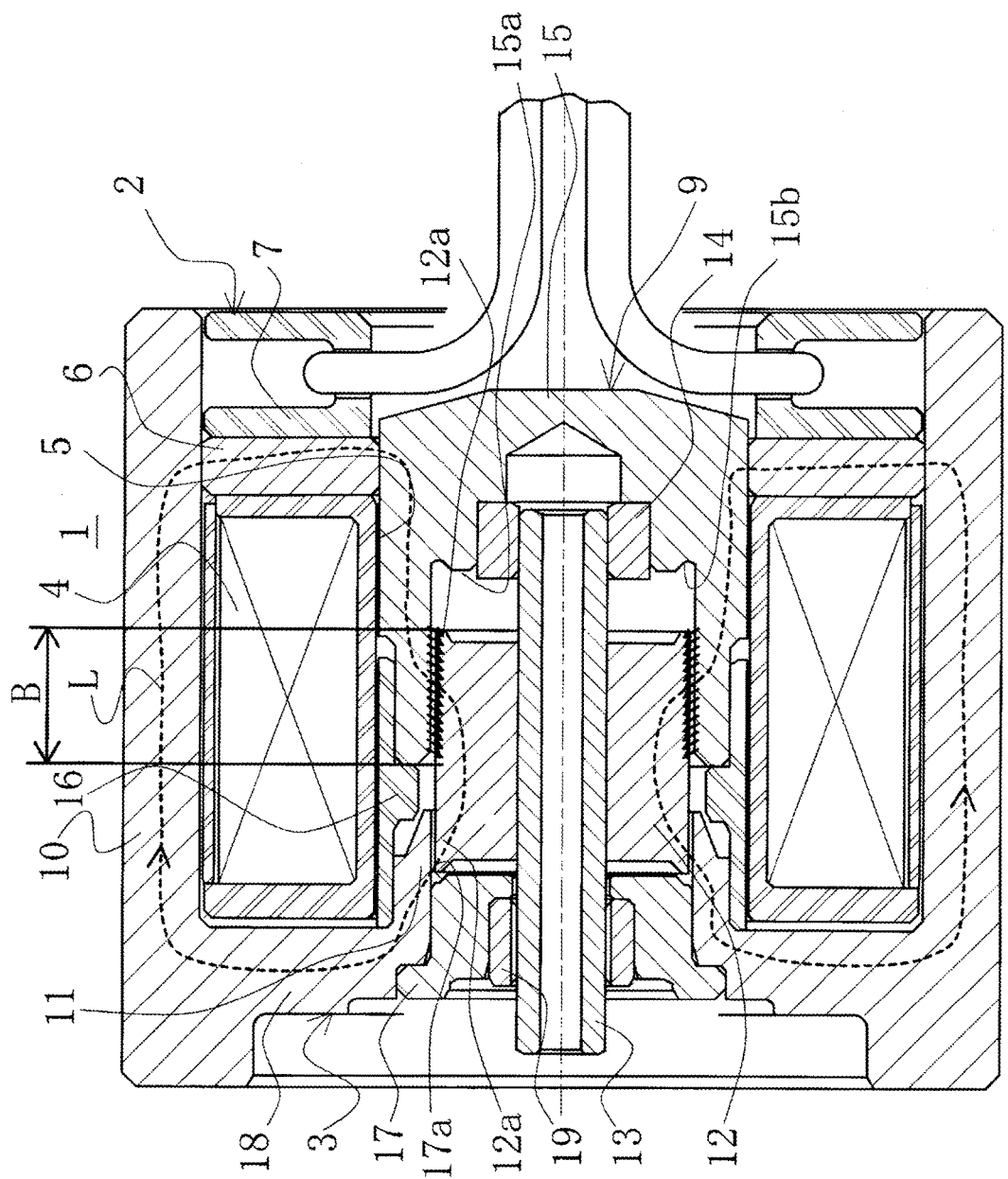
FIG. 2 is a cross-sectional view showing the solenoid according to the first embodiment of the present invention, showing a state where the coil is energized.

With reference to FIGS. 1 and 2, a solenoid according to a first embodiment of the present invention will be described.

A solenoid 1 is formed by integrating a molded coil 2 and a solenoid body 3 into one piece.

The molded coil 2 is wound with a coil 4. At the center of the coil 4, a hole 5 hollow toward the solenoid body 3 is formed.

Opposite to the solenoid body 3, the molded coil 2 is provided with an annular plate 6 adjacent to the coil 4. At the front of the plate 6, a molded portion 7 forming the bottom of the hole 5 is provided. In the molded portion 7, a coil wire drawn out from the coil 4 is connected to a lead wire 8. The plate 6 is formed from a magnetic material.

On the other hand, the solenoid body 3 is provided, at an axially central portion, with a column portion 9 inserted in the hole 5 of the molded coil 2, and a case 10 covering the outer perimeter of the molded coil 2 at a distance from the column portion 9 with a portion in which the molded coil 2 is disposed as an annular space.

The column portion 9 of the solenoid body 3 is provided with a magnetic attraction portion 11 formed integrally with the case 10 by one member, a plunger 12 magnetically attracted to the magnetic attraction portion by passing current through the coil 4, a rod 13 connected to the plunger 12, a bearing 14 supporting the rod 13, a sleeve 15 covering the distal end of the column portion 9, and a cylinder 16 made from a non-magnetic material forming a magnetic interruption portion between the sleeve 15 and the magnetic attraction portion 11. The sleeve 15 faces the magnetic attraction portion 11 via an air gap G and supports one end of the rod 13 connected to the plunger 12.

The plunger 12 has outer edge extensions 12a, 12a of the same shape formed on both sides by outer edge portions extended axially. Extension herein referred to means a state of axially protruding from the inside-diameter side. The dimensions and the shape of the outer edge extensions 12a are determined by design. In the case of the plunger 12 shown in FIG. 1, the radial thickness t of the outer edge extensions 12a is set at about 0.05 D where D is the diameter of the plunger 12, and the axially protruding amount m of the outer edge extensions 12a is at about 0.05M where M is the axial length of the plunger 12.

The thickness t and the protruding amount m of the outer edge extensions 12a are not limited to these, and are set appropriately depending on application to products.

A plug 17 is fitted into the inside-diameter side of the magnetic attraction portion 11 from an opening opposite to the plunger 12. A second bearing 19 is fitted in a recess on the inside-diameter side of the plug 17 opposite to the plunger 12.

The magnetic attraction portion 11 extends from the inside-diameter end of an annular radial portion 18 toward the molded coil 2. The case 10 also extends from the outside-diameter end of the annular radial portion 18 toward the molded coil 2.

An end face of the plunger 12 on the solenoid body 3 side faces the plug 17, and an end face of the plunger 12 opposite to the solenoid body 3 faces a recess bottom 15a of the sleeve 15. A recessed portion 15b is formed in a portion of the recess bottom 15a of the sleeve 15 corresponding to the outer edge extension 12a of the plunger 12. Likewise, a recessed portion 17a is formed in a portion of the plug 17 corresponding to the outer edge extension 12a of the plunger 12.

In the present embodiment, the sleeve 15 and the plug are disposed opposite to each other on axially both sides of the plunger 12, which is not limiting. When only one of the sleeve 15 and the plug 17 is disposed on axially one side of the plunger 12, the present invention can achieve the object. In that case, it is only necessary to form a recessed portion in the one member.

In the solenoid 1 of the above configuration, by supplying current to the coil 4 through the lead wire 8, as shown in FIG. 2, a magnetic circuit L through the magnetic attraction portion 11, the case 10, the plate 6, the sleeve 15, and the plunger 12, and back to the magnetic attraction portion 11 is formed, and the plunger 12 is magnetically attracted to the magnetic attraction portion 11.

In FIGS. 1 and 2, the plate 6 is provided. Alternatively, a radial portion having the same function as the plate 6 may be integrally provided to the case 10 or the sleeve 15. In that case, the plate 6 can be omitted, and the magnetic circuit L is formed through the magnetic attraction portion 11, the case 10, the sleeve 15, and the plunger 12, and back to the magnetic attraction portion 11.

When no current is supplied to the coil 4, under a biasing force by a spring or the like not shown, the plunger 12 is located away from the magnetic attraction portion 11 as shown in FIG. 1.

As shown in FIG. 2, by the axially-extended outer edge extensions 12a, 12a formed at the outer edge portions of the plunger 12 on the both sides, in an attraction end state where the coil 4 is energized, and the plunger 12 is attracted to the magnetic attraction portion 11 side, the extent of a magnetic flux transfer portion B between the plunger 12 and the sleeve 15 is increased by about m, the protruding amount of the outer edge extension 12a, compared to a case where the outer edge extensions 12a, 12a are not formed, so that a magnetic flux reception area increased by the protruding amount m is obtained although the stroke is not changed compared to a case where the outer edge extensions 12a, 12a are not formed. Thus, attraction force near the end of attraction of the plunger 12 can be increased, necessary attraction force can be provided throughout without reducing required attraction force in a necessary stroke, and flat solenoid characteristics can be obtained.

Further, in this case, the recessed portions 15b, 17a are formed in the sleeve 15 and the plug 17, respectively, corresponding to the outer edge extensions 12a, 12a of the plunger 12, so that there is no need to increase the body dimensions (size) of the solenoid.

Figure 3:
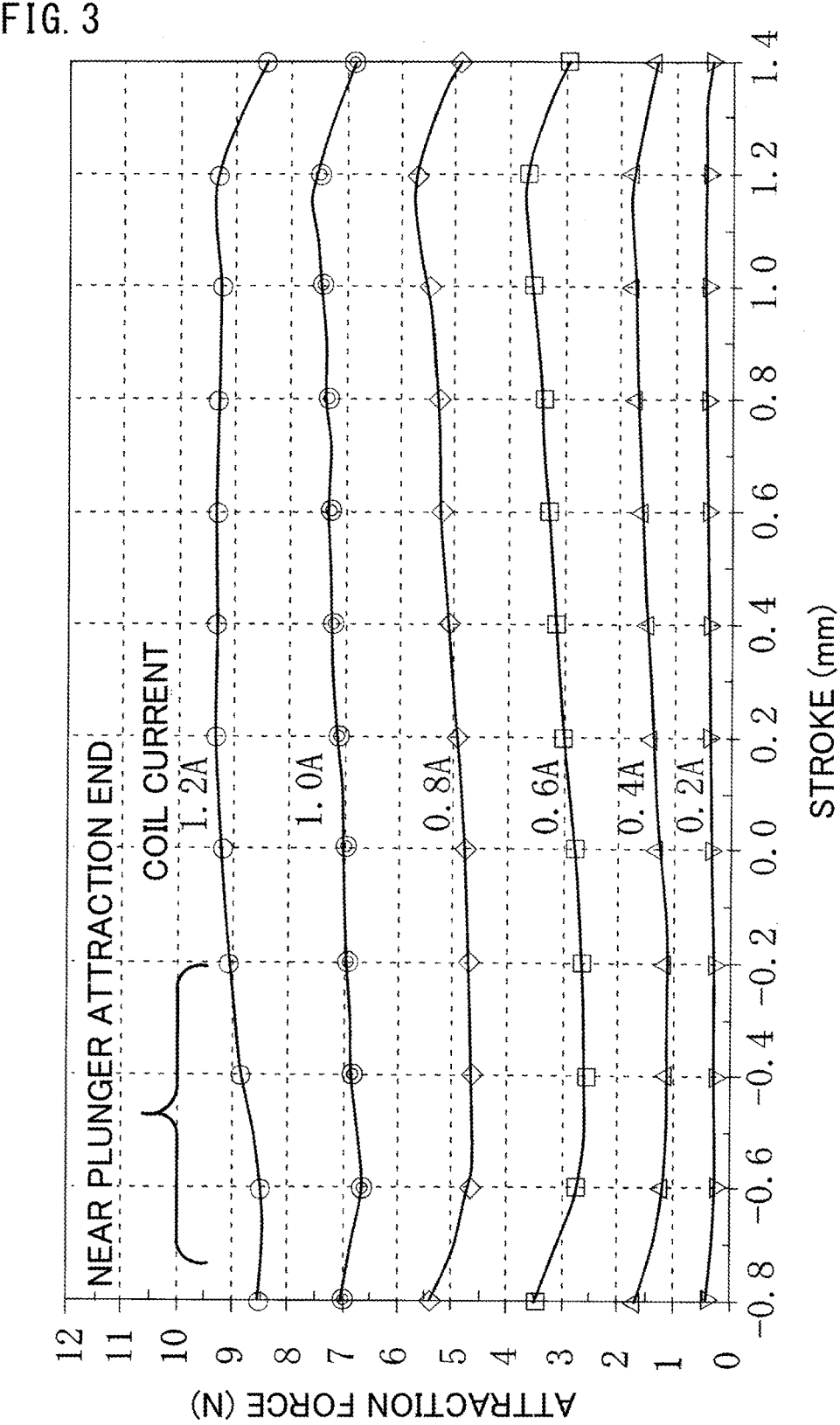
FIG. 3 is a graph showing the attraction force characteristics of the solenoid according to the first embodiment of the present invention.
Figure 4:
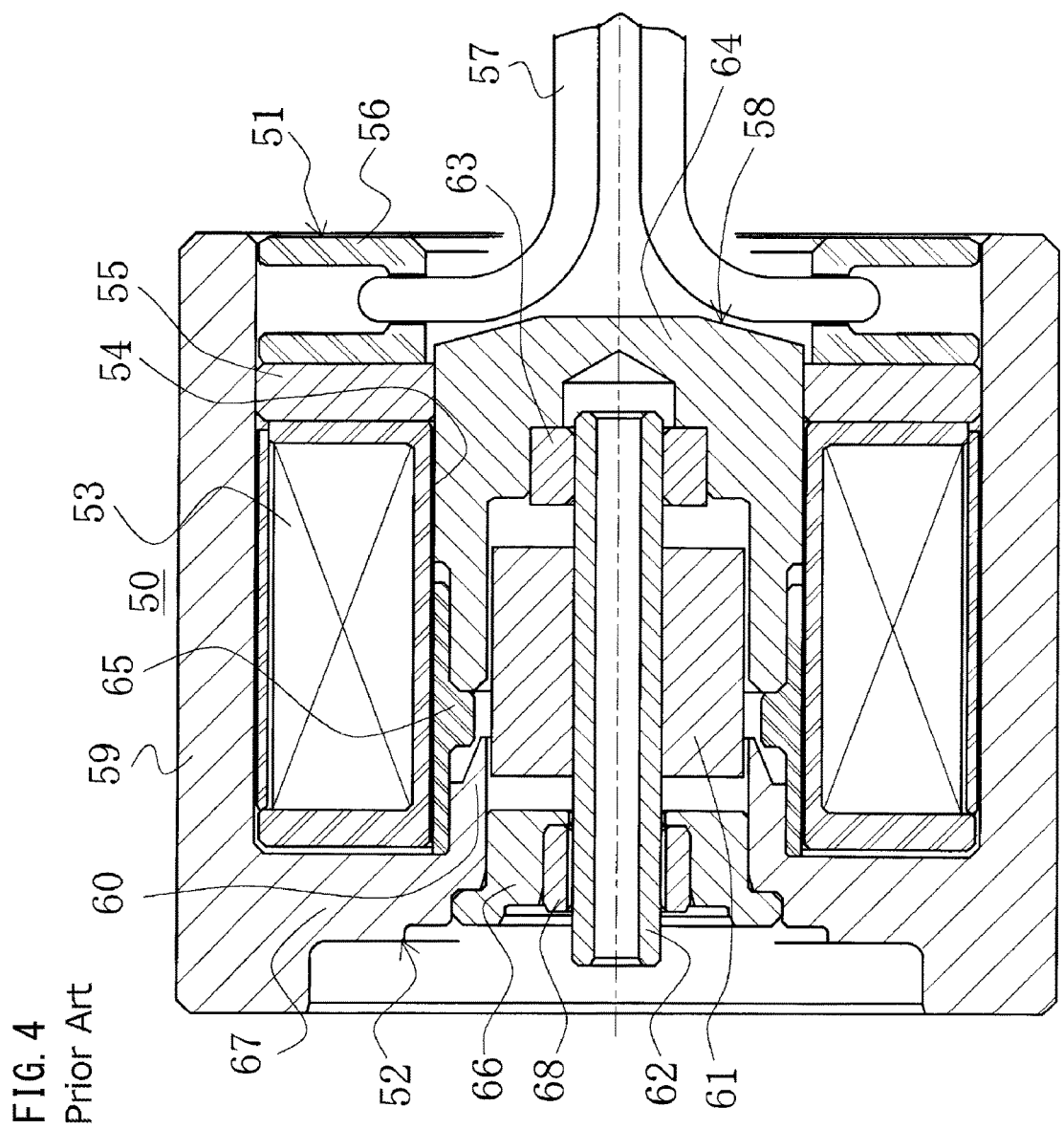
FIG. 4 is a cross-sectional view showing a solenoid of Conventional Art 1, showing a state where a coil is not energized.
Figure 5:
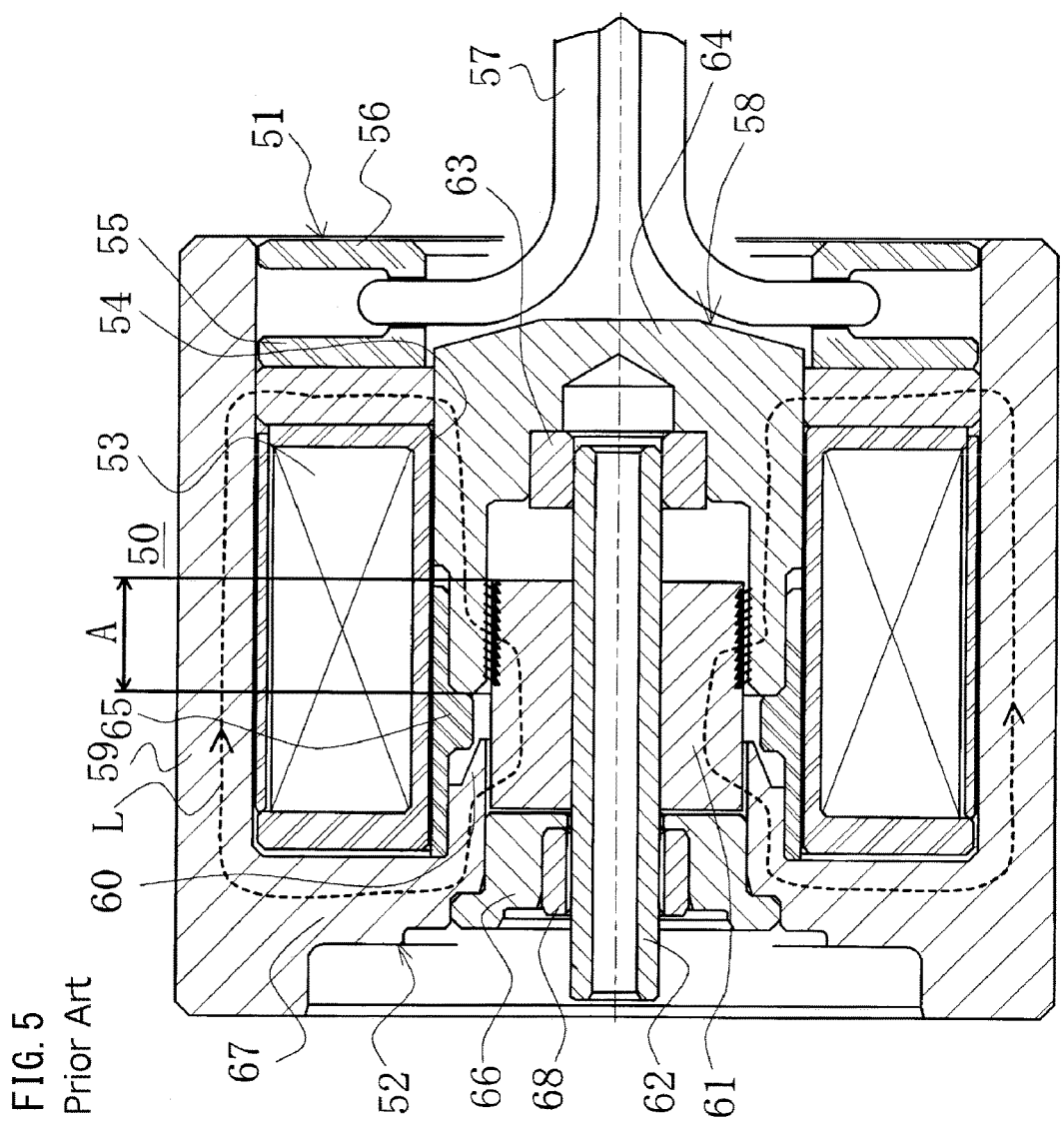
FIG. 5 is a cross-sectional view showing the solenoid of Conventional Art 1, showing a state where the coil is energized.
Figure 6:
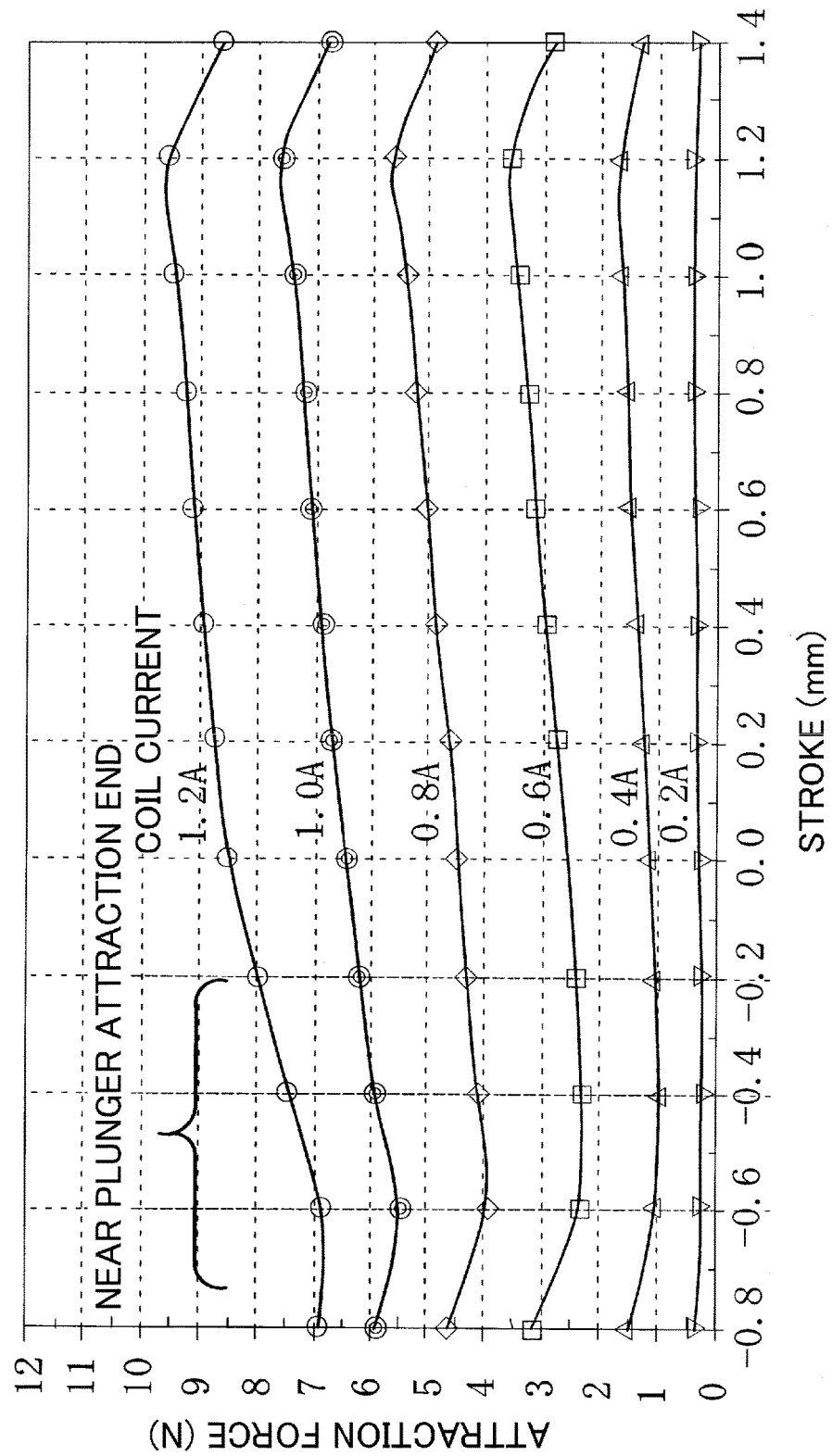
FIG. 6 is a graph showing the attraction force characteristics of the solenoid of Conventional Art 1.

Next, referring to FIG. 3 showing the attraction force characteristics of the solenoid according to the first embodiment of the present invention, and FIG. 6 showing the attraction force characteristics of the solenoid of Conventional Art 1, the attraction force characteristics of them will be described.

In the solenoid according to the first embodiment of the present invention in FIG. 3, the attraction force (N) between the plunger 12 and the sleeve 15 near the end of attraction of the plunger 12 decreases only slightly compared to the attraction force in the other stroke portion.

By contrast, in the solenoid of Conventional Art 1 in FIG. 6, the attraction force (N) between the plunger and the sleeve near the end of attraction of the plunger decreases considerably compared to the attraction force in the other stroke portion.

For example, when a comparison is made for a coil current of 1.2 A, in the solenoid according to the first embodiment, the attraction force near the end of attraction of the plunger 12 is 8.5 N, which is lower than a maximum value of 9.3 N by only 0.8 N, while in the solenoid of Conventional Art 1, the attraction force near the end of attraction of the plunger is 7.0 N, which is lower than a maximum value of 9.7 N by 2.7 N.

Thus, in the solenoid according to the first embodiment of the present invention, flat solenoid characteristics can be obtained compared to the solenoid of Conventional Art 1.

The solenoid in the first embodiment has the configuration as described above, and achieves the following outstanding effects:

(1) The plunger 12 has the outer edge extensions 12a formed by the outer edge portions extended axially, so that the attraction force near the end of attraction of the plunger 12 can be increased, necessary attraction force can be provided throughout, and flat solenoid characteristics can be obtained.

Further, since only the outer edge portions of the plunger 12 are extended, an increase in the weight of a movable portion can be reduced, and the worsening of responsivity can be prevented.

(2) The recessed portions 15b, 17a are formed in the sleeve 15 and the plug 17, members facing the outer edge extensions 12a, respectively, so that a magnetic flux reception area in the attraction end state of the plunger can be increased without changing the stroke range, compared to a condition where there are no outer edge extensions, flat solenoid characteristics can be obtained without reducing attraction force in the entire range of the stroke, and stable drive can be provided. The body dimensions (size) of the solenoid are not increased. Further, since there is no need to increase the body dimensions (size) of the solenoid, increases in the material cost and the production cost can be prevented.

(3) Since the outer edge extensions 12a, 12a are formed at both ends of the plunger 12 in the direction in which the plunger 12 is moved by magnetic force, the shape of the plunger 12 is symmetrical with respect to the movement direction. Therefore, when the solenoid is assembled, it can be assembled without caring about the forward and reverse directions of the plunger 12, providing favorable assembling characteristics.

The embodiment of the present invention has been described above with the drawings, specific configurations are not limited to the embodiment. Any changes and additions made without departing from the scope of the present invention are included in the present invention.

For example, the embodiment has been described on the case where the sleeve 15 and the plug 17 are disposed opposite to each other on both sides of the plunger 12, which is not limiting. When only one of the sleeve 15 and the plug 17 is disposed on axially one side of the plunger 12, the present invention can achieve the object. In that case, it is only necessary to form a recessed portion in the one member.

Further, for example, the embodiment has been described on the case where the outer edge extensions 12a, 12a are formed at both ends of the plunger 12 in the direction in which the plunger 12 is moved by magnetic force, which is not limiting. An outer edge extension 12a may be formed only at one end of the plunger 12 in the direction in which the plunger 12 is moved by magnetic force.

REFERENCE SIGN LIST 1 solenoid
2 molded coil
3 solenoid body
4 coil
5 hole
6 plate
7 molded portion
8 lead wire
9 column portion
10 case
11 magnetic attraction portion
12 plunger
12a outer edge extension
13 rod
14 bearing
15 sleeve
15a recess bottom
15b recessed portion
16 cylinder
17 plug
17a recessed portion
18 annular radial portion
19 second bearing

The invention claimed is:

1. A solenoid comprising:
a molded coil having a hole at a center of a coil of a plurality of turns;
a solenoid body having a case covering an outer perimeter of the molded coil, an axially movable plunger inserted in the hole at the center of the molded coil, and a magnetic attraction portion disposed in a direction in which the plunger is moved and attracted by magnetic force produced by the coil;
a plug fitted into the magnetic attraction portion; and
a sleeve facing the magnetic attraction portion via an air gap and supporting one end of a rod connected to the plunger,
wherein the plug is disposed on one side of the plunger in an axial direction of the plunger, and the sleeve is disposed on another side of the plunger in the axial direction of the plunger,
a magnetic circuit is formed through the magnetic attraction portion, the case, the sleeve, and the plunger, and back to the magnetic attraction portion,
the plunger has an outer diameter constant in the axial direction, and has a plug-side end face facing the plug and a sleeve-side end face facing the sleeve,
the plug-side end face of the plunger has an outer edge extension extending in the axial direction only along an outer peripheral edge of the plug-side end face,
the sleeve-side end face of the plunger has an outer edge extension extending in the axial direction only along an outer peripheral edge of the sleeve-side end face,
the outer edge extension of the plug-side end face and the outer edge extension of the sleeve-side end face are protrusions protruding in a same shape,
the plug has a recess corresponding to the protrusion of the plug-side end face of the plunger at a position facing the plug-side end face of the plunger in the axial direction, and
the sleeve has a recess corresponding to the protrusions of the sleeve-side end face of the plunger at a position facing the sleeve-side end face of the plunger in the axial direction.

\* \* \* \* \*